United States Patent
Kassel et al.

(10) Patent No.: US 9,272,244 B2
(45) Date of Patent: Mar. 1, 2016

(54) METERING SYSTEM (71) Applicant: Albonair GmbH, Dortmund (DE)

(72) Inventors: Armin Kassel, Hagen (DE); Michael Kolm, Dortmund (DE); Werner Overhoff, Marl (DE)

(73) Assignee: Albonair GmbH, Dortmund (DE)

( * ) Notice: Subject to any disclaimer, the term of this patent is extended or adjusted under 35 U.S.C. 154(b) by 114 days.

(21) Appl. No.: 14/096,176

(22) Filed: Dec. 4, 2013

(65) Prior Publication Data

US 2014/0093434 A1 Apr. 3, 2014

Related U.S. Application Data (63) Continuation-in-part of application No. 12/691,556, filed on Jan. 21, 2010, now abandoned.

(30) Foreign Application Priority Data

Jan. 22, 2009 (DE) .......................... 10 2009 005 790

(51) Int. Cl.
| | |
|---|---|
| *F01N 3/00* | (2006.01) |
| *B01D 53/94* | (2006.01) |
| *F01N 3/20* | (2006.01) |
| *F23J 15/00* | (2006.01) |

(52) U.S. Cl.
CPC ............ *B01D 53/9495* (2013.01); *F01N 3/208* (2013.01); *F23J 15/003* (2013.01); *F01N 2550/05* (2013.01); *F01N 2610/02* (2013.01); *F01N 2610/08* (2013.01); *F01N 2610/1453* (2013.01); *F02M 2200/31* (2013.01); *F23J 2219/10* (2013.01); *Y02T 10/24* (2013.01)

(58) Field of Classification Search
CPC ...... F02D 41/029; F01N 9/002; F01N 3/0842; F01N 3/03; F01N 13/02
USPC ............. 60/274, 286, 295, 301, 303; 417/540
See application file for complete search history.

(56) References Cited

U.S. PATENT DOCUMENTS

| | | |
|---|---|---|
| 5,710,551 A | 1/1998 | Ridgeway |
| 6,029,315 A | 2/2000 | Flower |
| 6,050,088 A * | 4/2000 | Brenner .......................... 60/303 |

(Continued)

FOREIGN PATENT DOCUMENTS

| | | |
|---|---|---|
| DE | 19728343 C1 | 4/1999 |
| DE | 19819579 C1 | 9/1999 |

(Continued)

*Primary Examiner* — Patrick Maines
(74) *Attorney, Agent, or Firm* — Law Offices of Robert F. Zielinski LLC (57) ABSTRACT

The invention relates to an electronically controlled metering system having at least one sensor for injection of a reducing agent, especially a urea solution, into the exhaust gas stream of an internal combustion engine for selective catalytic reduction, the metering system being connected/connectable to a tank from which the reducing agent can be taken, the reducing agent being conveyed by means of a pump, the metering system having a first line which carries the reducing agent and the metering system having a compressed air supply and a second line which carries compressed air and at least one nozzle which is coupled to both lines and by which the reducing agent together with the compressed air can be injected into the exhaust gas stream, the metering system in the line which carries the reducing agent having at least one damping element for equalization of pressure fluctuations.

5 Claims, 8 Drawing Sheets

(56) References Cited

U.S. PATENT DOCUMENTS

| | | | |
|---|---|---|---|
| 6,209,315 B1 * | 4/2001 | Weigl | 60/274 |
| 6,250,078 B1 * | 6/2001 | Amendola et al. | 60/509 |
| 6,470,673 B1 * | 10/2002 | van Nieuwstadt et al. | 60/274 |
| 2003/0036683 A1 | 2/2003 | Kehr et al. | |
| 2004/0060286 A1 * | 4/2004 | Huber et al. | 60/286 |
| 2004/0177606 A1 * | 9/2004 | Scharsack | 60/286 |
| 2005/0252201 A1 | 11/2005 | Lecea et al. | |
| 2006/0086329 A1 | 4/2006 | Cornell et al. | |
| 2006/0130461 A1 * | 6/2006 | Gabrielsson et al. | 60/286 |
| 2007/0163232 A1 | 7/2007 | Ueno | |
| 2007/0186543 A1 * | 8/2007 | Bakaj et al. | 60/286 |
| 2007/0240405 A1 | 10/2007 | Nishina et al. | |
| 2008/0276601 A1 * | 11/2008 | Katou et al. | 60/287 |
| 2010/0319322 A1 * | 12/2010 | Huthwohl | 60/285 |
| 2012/0047880 A1 * | 3/2012 | Leonard et al. | 60/295 |

FOREIGN PATENT DOCUMENTS

| | | |
|---|---|---|
| DE | 19947198 A1 | 4/2001 |
| DE | 10059427 A1 | 6/2002 |
| DE | 102007030541 A1 | 1/2008 |
| DE | 102007048337 A1 | 1/2009 |
| JP | 05269348 A | 10/1993 |
| JP | 2002224592 A | 8/2002 |

\* cited by examiner

METERING SYSTEM

CROSS-REFERENCE TO RELATED APPLICATIONS

This application is a continuation-in-part of application Ser. No. 12/691,556, filed Jan. 21, 2010 which claims priority under 35 U.S.C. §119 to German Patent Application No. 10 2009 005 790.0, filed on Jan. 22, 2009, the entireties of which are hereby incorporated by reference.

The invention relates to a metering system for injection of a reducing agent, especially a urea solution, into the exhaust gas stream of an internal combustion engine for selective catalytic reduction, the metering system being connected/connectable to a tank from which the reducing agent can be taken, the reducing agent being conveyed by means of a pump, the metering system having a first line which carries the reducing agent and the metering system having a compressed air supply and a second line which carries compressed air and at least one nozzle which is coupled to both lines and by which the reducing agent together with the compressed air can be injected into the exhaust gas stream.

So-called SCR catalytic converters are used to reduce nitrogen oxide emission from diesel engines. For this purpose, a reducing agent is injected into the exhaust gas system with a metering device, i.e. atomized. The reducing agent is ammonia.

Since carrying ammonia in motor vehicles is a safety issue, urea in an aqueous solution with conventionally 32.5% a urea proportion, especially according to DIN 70070, is used. In the exhaust gas the urea breaks down at temperatures above 150° C. into gaseous ammonia and $CO_2$. The parameters for breakdown of urea are essentially time (vaporization time and reaction time), temperature and droplet size of the injected urea solution. In these SCR catalytic converters, by selective catalytic reduction (SCR) the emission of nitrogen oxides is reduced by roughly 90%. The urea solution used according to DIN 70070 is also labeled so-called AdBlue.

The urea solution is metered by means of a metering system, atomized and injected into the exhaust gas flow and provides for the desired chemical reaction in the SCR catalytic converter. In this connection, the nitrogen oxides are converted into nitrogen and water vapor.

In this metering system the urea solution, i.e. the reducing agent dissolved in the liquid, is conveyed by means of a membrane pump or piston pump to the atomizer nozzle. The metered amounts are set here by matching the stroke frequency at a constant metered amount per stroke.

The problem here is that the pump which is being used delivers its stroke volume during the delivery cycle in an interval of only roughly 5 ms in the direction of the nozzle. In this time interval a delivery pulse occurs which exceeds the atomizer capacity of the nozzle.

The object of the invention is to damp the delivered amount of reducing agent, i.e. urea solution, such that the amount at the nozzle over time has only a small fluctuation breadth and the atomizer capacity of the nozzle is not exceeded. Furthermore, based on the manner of operation of the delivery pump the pressure peaks which occur will be intercepted and damped.

This object is achieved as claimed in the invention by a metering system as claimed in claim 1. Advantageous developments are given in the dependent claims.

In a metering system for injection of a reducing agent, especially a urea solution, into the exhaust gas stream of an internal combustion engine for selective catalytic reduction, the metering system being connected/connectable to a tank from which the reducing agent can be taken, which reducing agent is conveyed by means of a pump, the metering system having a first line which carries the reducing agent, and the metering system having a compressed air supply and a second line which carries compressed air agent and at least one nozzle which is coupled to both lines and by which the reducing agent together with the compressed air can be injected into the exhaust gas flow, it is especially advantageous that the metering system in the line which carries the reducing agent have at least one damping element for equalization of pressure fluctuations. The reducing agent is then atomized by means of compressed air.

By the arrangement of the damping element in the line which carries the reducing agent, thus pressure peaks and pressure fluctuations are intercepted by the damping element, i.e. these pressure peaks no longer travel to the nozzle and the atomization capacity of the nozzle is thus no longer exceeded. The pressure peaks which occur as a result of the manner of operation of the pump, by means of which the reducing agent is conveyed, are intercepted by the damping element. This means that equalization of pressure fluctuations also subsumes the damping of pressure peaks.

The nozzle is preferably a binary nozzle, especially an externally mixing nozzle.

In generic metering systems the reducing agent is usually a urea solution according to DIN 70070, so-called AdBlue. But the invention is not limited thereto, but rather is suitable for injection of any reducing agent. Therefore also other ammonia solutions or alternative reducing agent solutions can be metered by means of the metering system as claimed in the invention.

The damping element as claimed in the invention is thus connected on the pressure side to the metering system, or is integrated into the metering system, optionally combined with a throttle. This damping element can be formed by an elastic line or alternatively or cumulatively by one or more gas bladders. A reduction of piston speed of the delivery pump is also recommended.

By using the damping element the pump surge is averaged over time and the delivery amount is routed almost continuously to the nozzle. By using the damping element, after turning off the metering, by means of an air flow a negative pressure is produced. This negative pressure reduces the volume of the elastic line or enlarges the volume of a gas bladder and for example the reducing agent is drawn out of the nozzle. When the air is shut off the damping element draws the reducing agent back out of the nozzle.

By the arrangement of the damping element in the line which carries the reducing agent, almost continuous delivery of the reducing agent to the nozzle is achieved. This yields an optimum spray picture of the air-supported nozzle, i.e. uniform atomization of the reducing agent by means of compressed air in the binary nozzle and the maximum atomization capacity of the nozzle is achieved and can be continuously maintained.

Furthermore, the arrangement of the damping element yields increased resistance to frost and reduces the danger of clogging of the nozzle after metering, i.e. after shutting off the metering, since the reducing agent is withdrawn from the nozzle.

The over delivery of valve-controlled pumps over time is reduced by the damping. Increased consistency of the delivery pump is established. In the arrangement of a gas bladder as the damping element the choice of the metering line with respect to material and dimensioning is optional. Furthermore, the arrangement of a damping element reduces noise emissions of the metering system.

Preferably the damping element is formed by one or more extensible line segments and/or at least one gas bladder.

In these versions of the invention with a gas bladder accumulator and/or elastic, i.e. extensible lines or line segments in the line which carries the reducing agent between the delivery pump and the atomization nozzle, more or less intermediate storage of the metering stroke thus takes place, i.e. of the damping of the pressure peaks by intermediate storage of energy. In addition the metering stroke can also be executed by the corresponding triggering of the pump such that it takes place over a time as long as possible, i.e. that a slower stroke at smaller metering amounts is elicited by the corresponding triggering of the pump.

This extensible, elastic line or this line segment is consequently able to stretch as a result of the increased internal pressure, i.e. expand its cross section, i.e. in this way to damp pressure peaks.

Furthermore it is advantageous here that these elasticities, i.e. the elastic line and/or gas bladder, suck back the urea-water solution when the delivery from the pump is turned off and thus the reducing agent is removed from the nozzle. This prevents clogging of the nozzle since the remaining reducing agent could decompose in the region of the nozzle and could clog it. The procedure in interruption of metering is detailed below.

It is especially advantageous if the metering system has a metering pump for delivery of the reducing agent, especially a discontinuously delivering pump, especially a membrane pump or a piston pump or the like.

The pressure peaks which may occur in a discontinuously delivering pump are intercepted by the damping element which can be formed for example by one or more gas bladders or one or more extensible, i.e. elastic line segments.

Preferably the compressed air delivery line has a throttle valve and/or a control valve, Especially preferably the pressure and/or the amount of air and/or the valve opening times in the compressed air delivery line can be/are controlled.

This means that the compressed air controlled preferably in the metering system as claimed in the invention is supplied by way of a corresponding control valve. The supplied amount of air at each operating point is adapted such that the droplet quality is sufficient for reduction and is matched to the operating point of the internal combustion engine. This means that the quality of atomization can be matched to the requirements. In this way, by matching the amount of compressed air, optimization with respect to energy demand can take place by the amount of compressed air being caused to approach the required minimum.

In one preferred embodiment, between the air valve in the compressed air delivery line and the nozzle, there is a sensor for measuring the pressure and/or the amount of air in the compressed air delivery line.

This sensor allows monitoring of the pressure of the compressed air system, or of the delivered amount of compressed air in the compressed air delivery line and thus matching by way of triggering of the air valve in the compressed air delivery line. In this way, at each operating point matching of the amount of air to the compressed air supply is possible.

In particular the air valve is a proportional control valve. By using a proportional control valve it is possible to exactly control the amount of air of the compressed air supply, i.e. the amount of air which is supplied to the exhaust gas flow for injection of the urea solution.

The sensor which is located between the air valve and the nozzle is preferably a pressure sensor by means of which the pressure in the compressed air system downstream of the air valve is monitored. This pressure sensor can be connected against the ambient pressure or also against the pressure in the urea-carrying line since it has been shown that pure differential pressure monitoring is sufficient.

Preferably there are means for computing the exhaust gas mass flow and/or a sensor for measuring the exhaust gas mass flow and/or a sensor for measuring the exhaust gas temperature. In this way it is possible to determine the exhaust gas mass flow and/or the exhaust gas temperature in order to use these measured quantities as input quantities for triggering the metering system.

Preferably still, the computing means will be selected from dedicated on-board computers, CPUs, Application Specific Integrated Circuits (ASICs) and special function Electronic Control Units (collectively, "ECUs"). Automotive ECUs are generally well known and typically control the fuel injection system, ignition timing, and the idle speed control system. ECUs can also interrupt the operation of the air conditioning and EGR systems, and controls power to the fuel pump (through the control relay). ECUs typically consist of an 8-bit microprocessor, random access memory (RAM), read only memory (ROM), and an input/output interface. The ECU useful in the present invention, based on information from the input sensors (engine temperature, pressure, air flow, etc.), determines optimum settings for the output actuators triggering the metering system based on the information received from the sensors.

The sensor for measuring the exhaust gas mass flow can be a pitot probe in order to thus determine the total pressure of the exhaust gas mass flow by way of a continuity equation and the given geometry data.

As is detailed below, from the exhaust gas mass flow signal and/or exhaust gas temperature it is possible to detect the operating parameters, exhaust gas temperature and/or exhaust gas mass flow, which are present depending on the respective engine operating point and to evaluate them by way of the corresponding control electronics of the metering system ECU and to control the pressure and/or the amount of air and/or the valve opening times of the compressed air supply as a function of the measured operating parameters.

The influencing parameters for matching of the metering of the amount of air are especially the following:
  i. exhaust gas temperature
  ii. exhaust gas mass flow
  iii. urea mass flow (mass flow of the reducing agent)
  iv. required catalytic converter efficiency
  v. catalytic converter size (geometry data)
  vi. treatment distance between urea injection and the catalytic converter.

Thus, with the metering system as claimed in the invention it is possible to optimize the amount of air at each individual operating point depending on the respective boundary conditions.

Especially preferably the compressed air supply has a compressor, i.e. a compressor for compression of air to an increased pressure.

By means of this compressed air compressor it is possible to make available the compressed air required for the metering system, provided that in the vicinity of the installation of the metering system there is no compressed air supply or only an insufficient compressed air supply, for example in the form of the compressed air supply and of the compressed air system of a truck.

Preferably between the first line and the second line there is a connecting line, the connecting line having a non-return valve.

In order to completely interrupt air supply in a longer interruption of metering, it is necessary to remove the urea from the hot regions in order to avoid the formation of deposits. Otherwise the urea would decompose at high temperatures and lead to deposits and thus to clogging.

Placing a compressed air line between the urea line and the compressed air supply line, i.e. between the first line and the second line, can prevent these deposits by the urea line being blown out by means of compressed air in the metering pauses. Thus there is a connecting line between the first line and the second line via which the first line, i.e. the reducing agent-carrying line, is blown out by means of compressed air when the delivery of the reducing agent is shut off.

A non-return valve is inserted into this connecting line and its opening pressure is above the air pressure which is established during metering downstream of the air valve.

In metering operation, this non-return valve is closed since the pressure in the compressed air line is below the opening pressure of the non-return valve. In order to blow out the urea line with compressed air, urea delivery by the metering pump is shut off and the air valve is briefly opened so far that the pressure rises over the opening pressure of the non-return valve. As a result of the throttle in the compressed air line a pressure gradient arises in the metering line and the compressed air drives the urea into the exhaust gas system. The line is thus blown out. After a brief air surge the urea is blown out of the metering nozzle and the air supply can be completely shut off.

For only brief interruptions of metering however, as a result of a development as claimed in the invention blowing out the reducing agent-carrying line can be omitted, as is explained below.

In the versions of the invention with a gas bladder accumulator or elastic lines, when the metering is shut off the urea-water solution can be sucked back out of the nozzle in order not to expose it to high temperatures over a longer time after shutoff. Here the urea-water solution could decompose and clog the nozzle. For this purpose, in an air-supported system first the metering is shut off. If the compressed air first remains connected and the air flow if possible is even increased by way of a proportional valve, a negative pressure is formed by a suction effect on the nozzle in the urea-water line. Urea is sucked out of the line and atomized. If afterwards the air is shut off, in turn ambient pressure is established in the line system and the elasticities, i.e. the elastic line and/or the gas bladder, suck back the urea-water solution.

Preferably the metering system has a control device by means of which a metering pump and/or an air valve and/or a throttle valve and/or a compressor are controlled/can be controlled depending on the measured values which are detected by one or more sensors. Preferably still, the control devices are selected from dedicated on-board computers, CPUs, Application Specific Integrated Circuits (ASICs) and special function electronic control units (collectively, "ECUs"). ECUs typically consist of an 8-bit microprocessor, random access memory (RAM), read only memory (ROM), and an input/output interface. ECUs are generally well known and typically control many aspects of engine operation including but not limited to fuel injection systems, ignition timing, and idle speed control systems. ECUs can also interrupt the operation of the air conditioning and EGR systems, and control power to the fuel pump (through a control relay). ECUs determine optimum settings for the output actuators triggering the metering system based on information from the input sensors (engine temperature, pressure, air flow, etc.). The ECU is programmed to both monitor the sensor readings and to adjust the metering pump, air valves, throttle valves or compressor operation depending on the measured values which are detected by one or more sensors in order to optimize output performance.

For example, the arrangement of the ECU which controls one or more components of the metering system as a function of the sensor measured values, i.e. as a function of the current operating parameters, enables optimization of operation of the metering system, i.e. air optimization or optimization of injection/atomization of the reducing agent in an especially advantageous and energy-saving manner. By means of this control device it is thus possible to adapt and control the delivery amount of reducing agent and the delivery amount of air in the optimum manner to the current operating parameters of the internal combustion engine and of the catalytic converter for selective catalytic reduction.

Preferably the metering system furthermore has a reducing agent tank, i.e. especially a urea solution tank. Because the metering system itself has a reducing agent tank, it is possible to retrofit the metering system in the corresponding environments in which this tank is not already present.

The metering system for injection of a reducing agent, especially a urea solution, into the exhaust gas flow of an internal combustion engine for selective catalytic reduction is triggered preferably such that the amount of compressed air supplied for atomization of the urea solution at each operating point is controlled and matched depending on the operating parameters—exhaust gas temperature and exhaust gas mass flow—such that the droplet quality of the injected urea solution is optimized for the action of the catalytic converter.

When injection of the urea solution is interrupted or ended, preferably the urea solution is removed from the urea solution—carrying lines by means of compressed air and compressed air delivery lasts longer after the metering pump has been turned off so that a negative pressure is produced by means of the air flow so that after the compressed air is turned off the reducing agent is withdrawn through the elastic damping element in the urea-carrying line and thus the reducing agent is removed from the nozzle.

One exemplary embodiment of the invention is shown in the figures and is explained below.

FIG. 1 shows an installation diagram of one embodiment of the metering system during metering operation, i.e. with the delivery of the reducing agent turned on and compressed air delivery turned on;

FIG. 2 shows an installation diagram of the metering system as shown in FIG. 1 immediately after turning off the delivery of reducing agent, with the delivery of compressed air turned on;

In the figures identical components or assemblies are each labeled with identical reference numbers.

Figure 1:
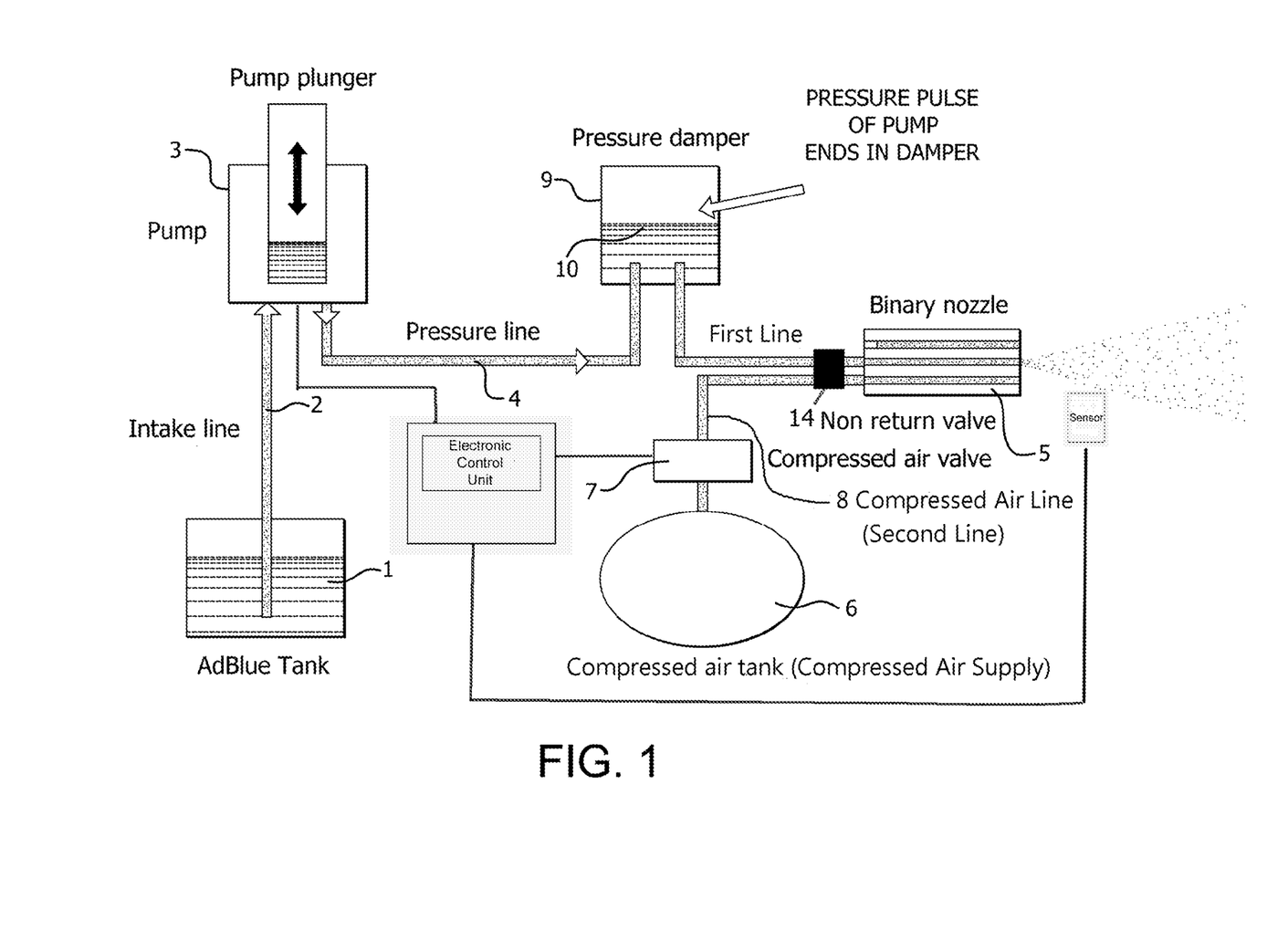
Figure 2:
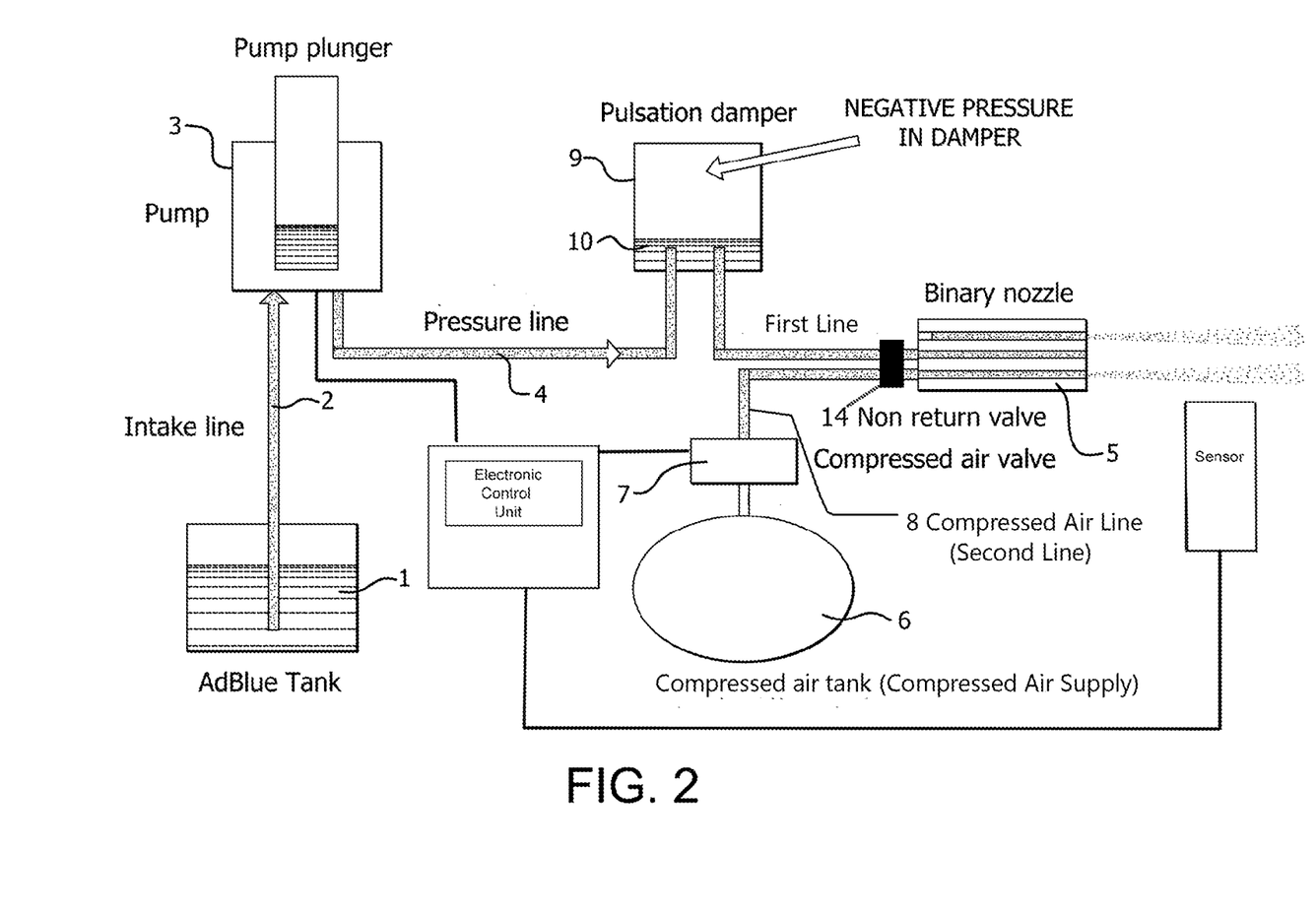
Figure 3:
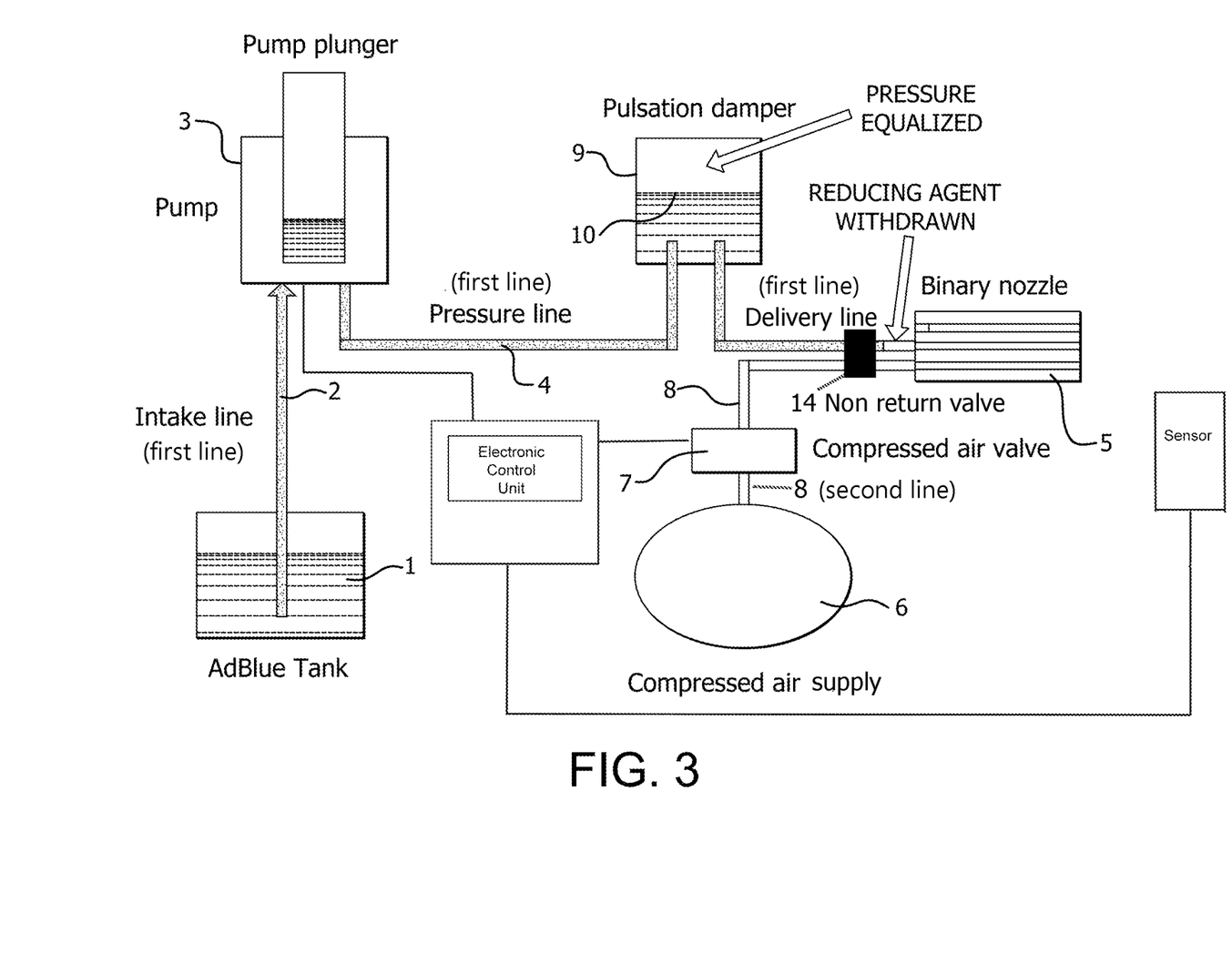
FIG. 3 shows an installation diagram of the metering system as shown in FIG. 1 with the reducing agent delivery turned off and immediately after turning off the compressed air delivery.
Figure 4:
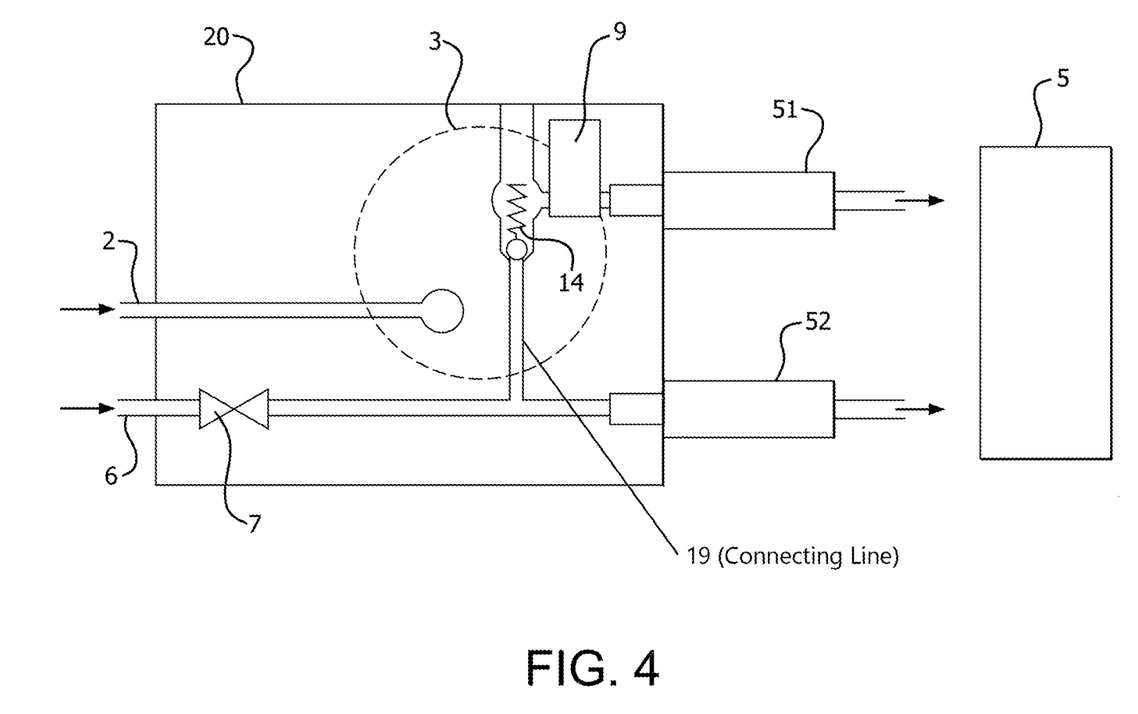
FIG. 4 shows a top view of the metering system as claimed in the invention.

FIGS. 1 to 3 schematically show a urea metering system in different operating states. FIG. 4 shows one embodiment of a metering system as claimed in the invention in a top view.

The urea solution is in-taken from a tank 1 by way of an intake line 2 by the metering pump 3. In the embodiment shown in FIGS. 1 to 3, the metering pump 3 is a piston pump which with each stroke delivers a defined amount of urea solution. By way of a pressure line 4 the urea is routed into the tank 9 and then from the tank 9 further to the binary nozzle 5. The intake line 2, pressure line 4 and pulsation damper 9 thus form the line which carries the reducing agent and which ends in the nozzle 5.

The binary nozzle 5 atomizes the urea. For this purpose compressed air is routed out of a compressed air tank 6 to a proportional air valve 7. The proportional air valve 7 sets the compressed air flow to a definable value. The pressure upstream of the binary nozzle 5 is a measurement of the passed volumetric flow of air. The air is routed by way of a compressed air line 8 from the compressed air tank 6 via the proportional valve 7 to the binary nozzle 5. The urea is atomized in the binary nozzle 5 by the compressed air and supplied to the exhaust gas flow.

In one alternative which is not shown, the compressed air is supplied not by way of a compressed air tank, but on the side of the compressed air system of the truck into which the metering system for exhaust gas after-treatment has been incorporated.

As a result of the discontinuous delivery of the metering pump 3, pressure fluctuations and pressure peaks occur in the pressure line 4. The pressure pulse of the pump ends in the pulsation damper 9 which has a gas bladder above the urea solution meniscus 10, i.e. the liquid level 10.

FIG. 1 shows the atomization mode, i.e. the metering system is in operation and the reducing agent is being atomized in the binary nozzle 5 by means of compressed air for injection into the exhaust gas stream of the internal combustion engine. FIG. 1 thus shows the installation during metering operation, i.e. with reducing agent delivery turned on and compressed air delivery turned on.

Pressure pulses of the discontinuously delivering piston pump 3 end in the pulsation damper 9. The gas bladder in the pulsation damper 9 is visible above the liquid meniscus 10, i.e. the location of the phase boundary 10 between the reducing agent solution and the gas bladder. The arrangement of the damping element 9 in the form of the gas bladder on the pressure side makes available and delivers the urea solution with a uniform pressure to the binary nozzle 5.

In contrast to FIG. 1 which shows the metering system in operation, FIG. 2 shows the situation of a disengaged pump with the compressed air turned on. FIG. 2 thus shows the installation diagram of the metering system as shown in FIG. 1 immediately after turning off the delivery of reducing agent with the compressed air delivery still turned on.

Here a negative pressure is formed in the damper 9, i.e. the gas bladder expands and the liquid meniscus 10 drops while the compressed air continues to be removed from the compressed air tank 6 and to be routed to the binary nozzle 5. In this operating state as shown in FIG. 2, the pump is off and the compressed air is connected, i.e. metering is to be ended.

FIG. 3 shows the state when the compressed air is also off after the pump 3 has been turned off. FIG. 3 thus shows the installation diagram of the metering system with the delivery of the reducing agent turned off and immediately after the delivery of compressed air has been turned off.

In the operating case shown in FIG. 3, in which both the pump and also the compressed air supply are off, an equalized pressure is re-established in the pulsation damper 9, i.e. the liquid meniscus 10 of the urea solution rises again in the pulsation damper 9, as is shown in FIG. 3. The liquid level 10, i.e. the phase boundary 10 between the urea solution and the gas bladder in the tank 9 has now risen again due to the equalized pressure. The reducing agent is withdrawn accordingly from the binary nozzle 5. The binary nozzle 5 can therefore no longer be clogged by the urea solution crystallizing out.

FIG. 4 shows a top view of a mounted arrangement of one embodiment of the metering system as claimed in the invention. The pump 3 as well as the proportional air valve 7 and the non-return valve 14 of the metering system as shown in FIG. 1 are arranged as shown in FIG. 4 on a component carrier 20. The component carrier 20 integrates connections for the urea line 2 and the compressed air line 6, on the other side of the connections 51, 52 to the nozzle 5, and within the component carrier 20 the corresponding lines.

The urea solution delivered by the pump 3 is supplied to the nozzle 5 via the connection 51. Compressed air for atomization of the urea solution is supplied to the nozzle 5 via the connection 52.

There is a spring-loaded non-return valve 14 between the pressure side of the pump 3 and the compressed air supply. The pulsation damper 9 in the form of a tank which contains a gas bladder is located in terms of flow engineering directly upstream of the connection 51 into the reducing agent-carrying line downstream of the pump 3, i.e. on the pressure side of the pump 3. In this damping element 9, i.e. the tank 9, the pressure fluctuations proceeding from the piston pump 3 end before the reducing agent solution is relayed to the binary nozzle 5 via the connection 51. In the nozzle 5 atomization takes place by means of the compressed air which is routed to the nozzle via the connection 52.

The damping element 9 intercepts pressure peaks in the reducing agent-carrying line and equalizes pressure fluctuations before the reducing agent is routed to the nozzle 5.

The elasticity of the damping element 9 furthermore makes it possible to remove reducing agent from the binary nozzle 5 when metering ends by the compressed air delivery being turned off somewhat later.

Various possible shutoff routines for removal of the urea solution from the binary nozzle 5 are shown in FIGS. 5 to 8 and are explained below. The time behavior of the absolute pressure of the air P_abs air [bar] over time T is shown.

Figure 5:
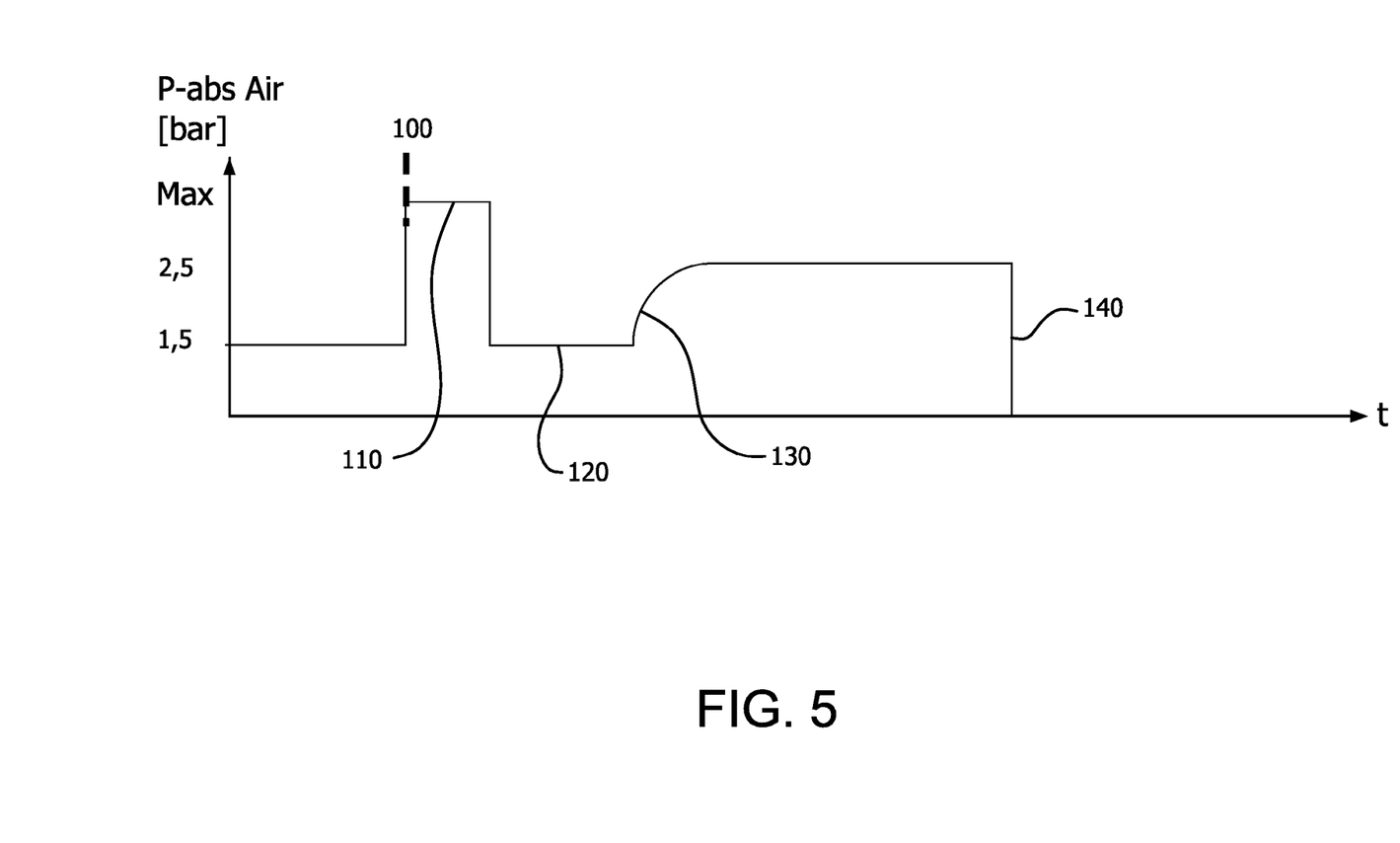
FIG. 5 shows the pressure characteristic of the compressed air at the nozzle as a function of time in a first shutdown routine.

In the shutdown routine as shown in FIG. 5, up to the instant 100 continuous metering takes place, i.e. atomization of the reducing agent in conventional operation. At instant 100 metering is turned off by shutting off the pump.

Then blowing out takes place during the time interval 110 or an air bubble is delivered to the pressure sensor.

The regulator of the air valve of the metering is preset such that the valve does not close in order to blow droplets away from the nozzle during the time interval 120.

In the third time interval 130 the air pressure or the amount of air is slowly increased until shortly before opening of the non-return valve so that a negative pressure as strong as possible forms in the urea solution-carrying line and thus the air bubble which has been produced on the pressure sensor is expanded and the reducing agent is metered out of the line, i.e. the reducing agent is withdrawn from the line.

After a certain time interval expires, at instant 140 the air valve is preferably suddenly closed and the negative pressure disappears in the urea agent-carrying line. The air bubble on the pressure sensor contracts again and the urea solution located in the nozzle is drawn back into the metering line. In certain situations gradual closing with a certain time profile can also be necessary.

After shutdown, by additionally delivering air by means of an overpressure valve from the air branch, the gas bladder can thus be enlarged. This gas bladder can be "expanded" with negative pressure generation (suction action) of the nozzle by special metering of the air supply to the nozzle being implemented as explained above. After shutting off the air (instant 140) the gas bubble contracts again to the volume with ambient pressure and thus draws the reducing agent out of the nozzle back into the metering line.

Figure 6:
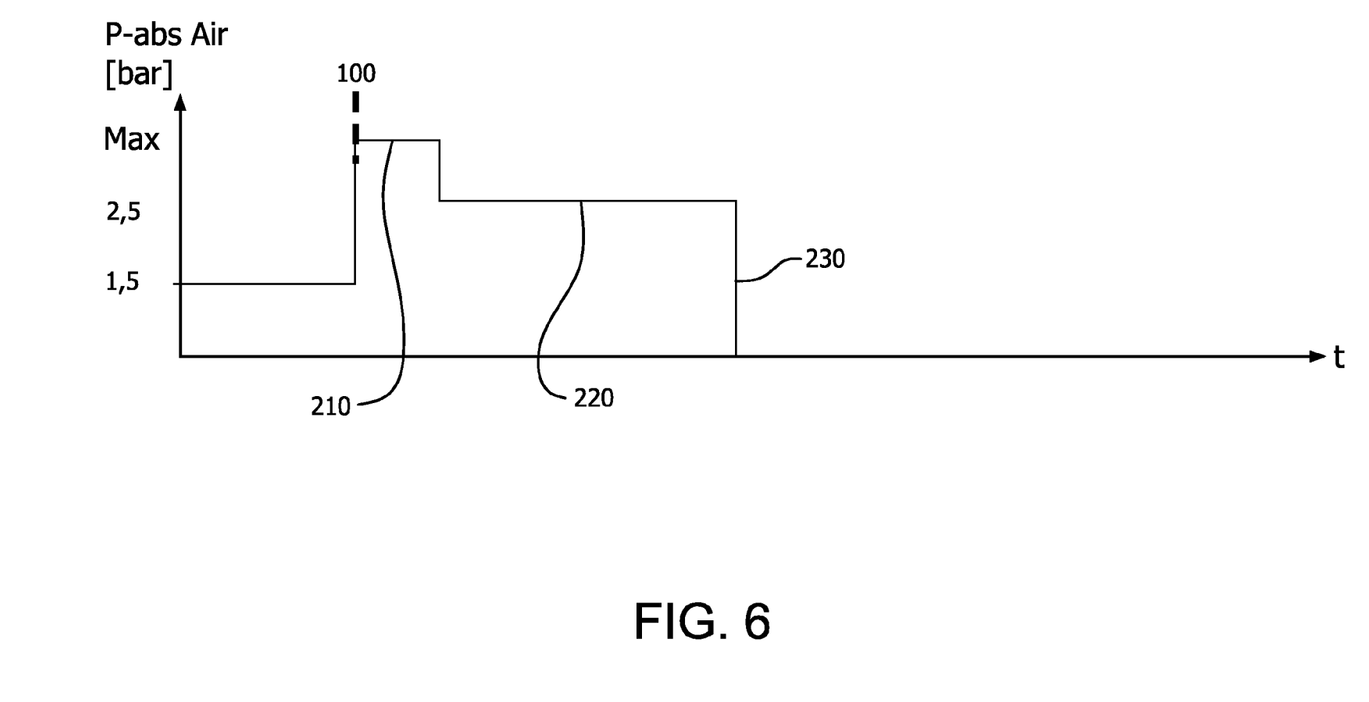
FIG. 6 shows the pressure characteristic of the compressed air at the nozzle as a function of time in a second shutdown routine.

FIG. 6 shows another shutdown routine. Here metering is shut off by shutting off the delivery pump at instant 200. During a subsequent time interval 120 blowout takes place, i.e. an air bubble is delivered in turn to the pressure sensor. Then, during the next time interval 220, further delivery of compressed air takes place, the controller of the air valve being preset such that the air pressure is set briefly before opening of the non-return valve so that a negative pressure as strong as possible forms in the urea line by the air flow and thus the generated air bubble on the pressure sensor is expanded and urea is metered out of the line, i.e. for example urea solution is withdrawn from the line.

Then, at instant 230 preferably sudden closing of the air valve takes place. The negative pressure in the urea agent line disappears and the air bubble on the pressure sensor contracts again so that the urea solution at the nozzle is drawn back into the metering line and urea is thus removed from the nozzle. In certain situations gradual closing with a certain time profile can also be necessary.

Figure 7:
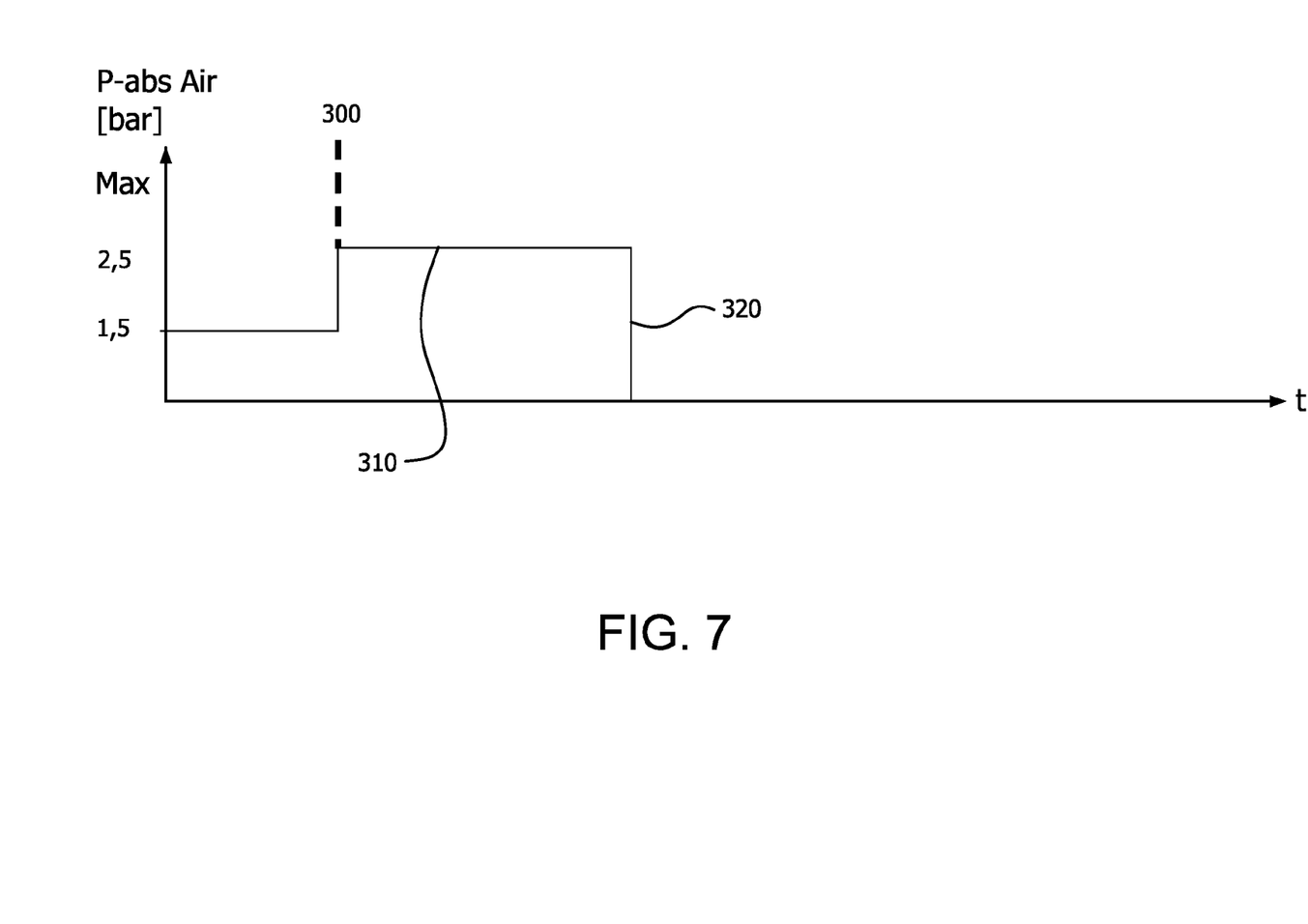
FIG. 7 shows the pressure characteristic of the compressed air at the nozzle as a function of time in a third shutdown routine.

A third version of the shutdown routine is shown in FIG. 7. At instant 300 the metering pump is shut off. The regulator of the air valve is preset such that the air pressure is set until shortly before opening of the non-return valve during time interval 310 so that a negative pressure as strong as possible in the urea line is formed by the air flow and thus the damping element (for example a flexible line) contracts and urea is withdrawn from the line.

Then, at instant 320 the air valve is preferably suddenly closed and the negative pressure in the urea line disappears. In this way, the damping element expands and the so-called AdBlue located in the nozzle, i.e. the urea solution, is withdrawn from the nozzle into the metering line. In certain situations, closing which is not sudden with a certain time profile can also be necessary.

Figure 8:
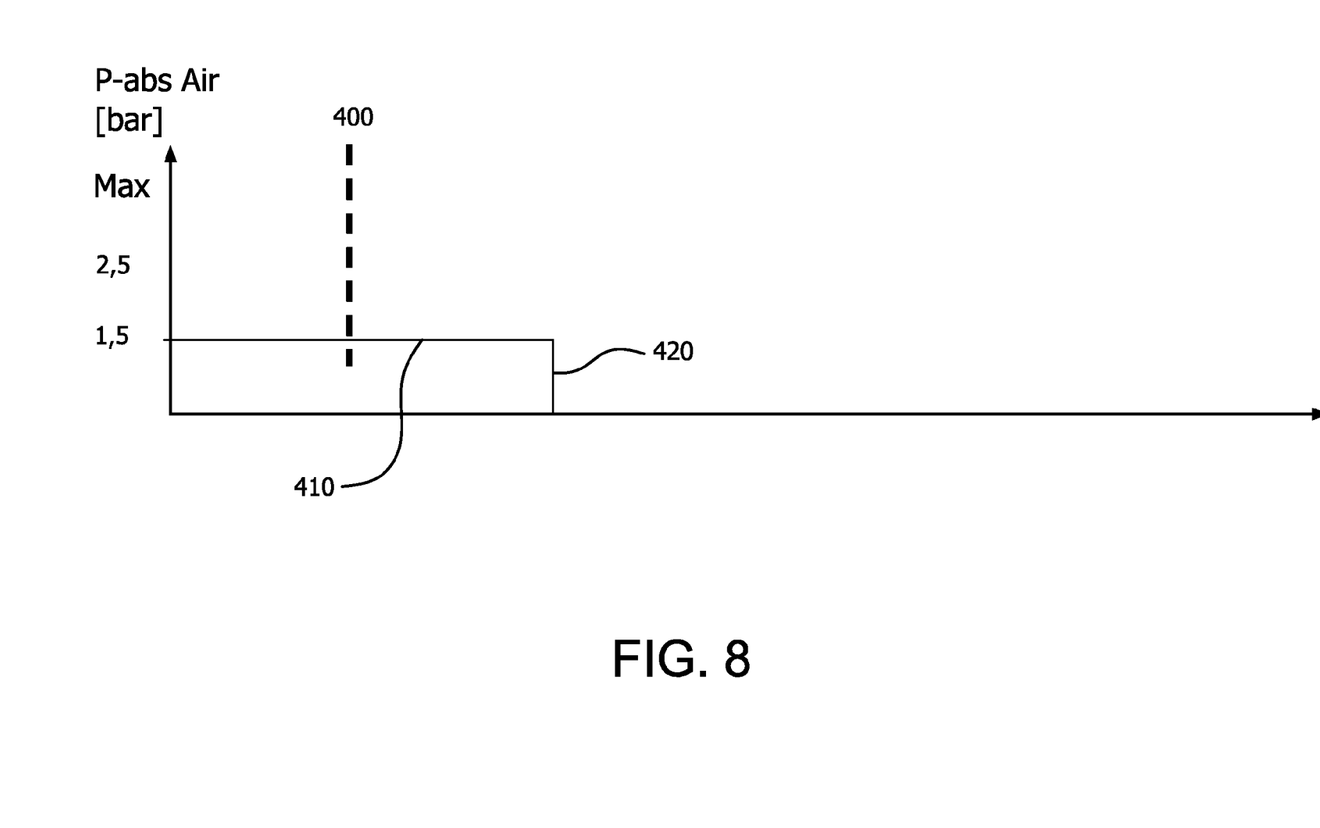
FIG. 8 shows the pressure characteristic of the compressed air at the nozzle as a function of time in a fourth shutdown routine.

A fourth possible shutdown routine is shown in FIG. 8. Here, at time 400 the metering pump is shut down, during which the compressed air delivery continues to be maintained at the identical pressure level during the time interval 410. During the time interval 410 which follows shutdown 400, the air flow remains unchanged and the negative pressure in the urea line expands the air bubble on the pressure sensor and for example the reducing agent solution is withdrawn.

At instant 420 the air valve is preferably suddenly closed, i.e. compressed air delivery is suddenly established and the negative pressure in the urea line disappears, by which the air bubble on the pressure sensor for example contracts and the urea solution on the nozzle is drawn back into the metering line. In certain situations gradual closing with a certain time profile can also be necessary.

Because the compressed air delivery is established in time after urea delivery, advantageously the action of the damping element 9 is used to remove the reducing agent from the nozzle 5 after metering is shut off in order to prevent possible clogging by crystallizing out. This ensures that the metering system after interruption of metering at any time can be immediately started again, for injection of the reducing agent into the exhaust gas flow of the internal combustion engine.

A calculation example for the described effect of the forming air bubble is given below:

Sample inputs: Air bubble = 5 ml

Air pressure = ambient pressure roughly 1000 mbar

Generated negative pressure by the air flow = 20 mbar.

Volume change of the air bubble after the air is shut off:

Difference volume = 5 ml [980 mbar with air flow]

5 ml ∗ 1000 mbar/980 mbar [1000 mbar air flow off] =

5 ml − 5 ∗ 980/1000 ml = 5 ml − 4.9 ml = 0.1 ml

This means 0.1 ml of the reducing agent solution, for example *AdBlue*, is drawn back out of the nozzle into the metering line.

For example, for a 2 mm hole in the nozzle this is a distance of:

withdrawn liquid distance = volume/hole area = 0.1 ml/(2 mm ∗ 2 mm ∗ 3.1415/4) with 1 ml =

1000 mm³ = 100 mm³/3.1415 mm² = roughly 32 mm

Under given assumptions, a column of more than 30 mm is thus established from which urea solution is removed. This ensures that the nozzle 5 cannot clog after the metering is turned off.

It will be understood that the special function electronic control units used in the present invention determine optimum settings for the output actuators triggering the metering system based on information from the input sensors (engine temperature, pressure, air flow, etc.). In this manner, the ECU is operatively engaged in the monitoring and adjustment of the metering pump, air valves, throttle valves and/or compressor operations depending on the measured values which are detected by one or more sensors of the metering system in order to optimize output performance.

The invention claimed is:

1. A metering system for selective injection of a urea solution reducing agent into an exhaust gas flow of an internal combustion engine for catalytic reduction controlled by an electronic control unit, comprising:
   at least one sensor operatively coupled to the electronic control unit;
   a tank from which the reducing agent can be taken, the reducing agent being conveyed by one of a membrane pump and a piston pump, a first line which carries the reducing agent, a compressed air supply connected to a compressor, a second line which carries compressed air, a control valve in the second line controlled by the electronic control unit, at least one nozzle which is coupled to the first and second lines and by which the reducing agent together with the compressed air can be injected into the exhaust gas flow, whereby the first line has at least one damping element formed by one or more extensible line segments and/or at least one gas bladder for equalization of pressure fluctuations measured by the at least one sensor wherein,
   the electronic control unit is configured, during a shutdown routine, to:
   at a first instant, shut off the metering pump which the control valve remains open to provide a supply of air, at a second instant, increase the supply of air to a predetermined air pressure via the control valve, thereby contracting the damping element and withdrawing the urea solution from the first line, and at a third instant, close the control valve, thereby expanding the damping element and withdrawing the urea solution from the nozzle.

2. The metering system according to claim 1, wherein between the control valve in the second line and the nozzle, the at least one sensor measures the pressure and/or the amount of air in the second line.

3. The metering system according to claim 1, wherein a first sensor measures an exhaust gas mass flow and a second sensor measures an exhaust gas temperature.

4. The metering system according to claim 1, wherein between the first line and the second line there is a connecting line, the connecting line having a non-return valve.

5. The metering system according to claim 1, wherein the metering pump and/or control valve and/or the compressor is adjusted depending on measured values which have been detected by the at least one sensor.

* * * * *